US007581091B2

(12) United States Patent
Gelinas et al.

(10) Patent No.: US 7,581,091 B2
(45) Date of Patent: *Aug. 25, 2009

(54) SYSTEM AND METHOD FOR EXTRACTING FIELDS FROM PACKETS HAVING FIELDS SPREAD OVER MORE THAN ONE REGISTER

(75) Inventors: Robert Gelinas, Needham, MA (US); Patrick W Hays, Cambridge, MA (US); Sol Katzman, Waltham, MA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/279,136

(22) Filed: Apr. 10, 2006

(65) Prior Publication Data
US 2006/0248316 A1 Nov. 2, 2006

Related U.S. Application Data

(63) Continuation of application No. 09/799,610, filed on Mar. 7, 2001, now Pat. No. 7,039,060.

(51) Int. Cl.
*G06F 7/00* (2006.01)
*G06F 9/00* (2006.01)
(52) U.S. Cl. ................... 712/300; 712/224; 712/220
(58) Field of Classification Search ............. 712/224, 712/220
See application file for complete search history.

(56) References Cited

U.S. PATENT DOCUMENTS

| 3,657,736 | A | * | 4/1972 | Boom et al. ............... 718/106 |
| 5,568,624 | A | * | 10/1996 | Sites et al. ................ 712/223 |
| 5,710,773 | A | * | 1/1998 | Shiga ....................... 370/512 |
| 5,838,984 | A | * | 11/1998 | Nguyen et al. ............... 712/5 |
| 6,032,190 | A | | 2/2000 | Bremer et al. |
| 6,061,783 | A | * | 5/2000 | Harriman ................... 712/224 |
| 6,308,253 | B1 | * | 10/2001 | Gadre et al. ................ 712/41 |
| 7,133,040 | B1 | * | 11/2006 | Abdallah et al. ............ 345/419 |
| 2001/0020266 | A1 | * | 9/2001 | Kojima et al. .............. 712/225 |

OTHER PUBLICATIONS

Intel IA-64 Architecture Software Developer's Manual, vol. 3: instruction Set reference, pertinent pp. 2-37 to 2-24 and 2-63 to 2-64.*
Intel, IA-64 Application Developer's Archiecture Guide, May 1999.*

* cited by examiner

*Primary Examiner*—Eddie P Chan
*Assistant Examiner*—Idriss N Alrobaye
(74) *Attorney, Agent, or Firm*—Sterne, Kessler, Goldstein & Fox P.L.L.C.

(57) ABSTRACT

Systems and methods that allow for extracting a field from data stored in a pair of registers using two instructions. A first instruction extracts any part of the field from a first register designated as a first source register, and executes a second instruction extracting any part of the field from a second general register designated as a second source register. The second instruction inserts any extracted field parts in a result register.

38 Claims, 8 Drawing Sheets

| 200 | 201 | 202 | 203 | 204 |
|---|---|---|---|---|
| Opcode for EXTIV (6 bits) | rS1 - Source of width and offset data (5 bits) | rT1 - Source of Low Order Word (5 bits) | rD1 - Temporary Register (5 bits) | 0 (5 bits) | Sub-Opcode for EXTIV (6 bits) |

*Fig. 2a*

| 210 | 211 | 212 | 213 | 214 |
|---|---|---|---|---|
| Opcode for INSV (6 bits) | rS2 - Background Data Register (5 bits) | rT2 - Source of High Order Word (5 bits) | rD2 - Result Register (5 bits) | 0 (5 bits) | Sub-Opcode for INSV (6 bits) |

710 — Program Executes an INSV instruction - INSV (rS2, rT2, rD2) - rS2 specifying background data register, rT2 specifying a register that may be holding a high order part of the field of data in question, rD2 specifying a destination register

720 — Read width m, extract offset n, insert offset p from a Temporary Register

730 — n<32 and (n+m-1)< 32?

740 (Yes) — Entire field was extracted from rT1 and placed in temp2 by EXTIV. Extracted Field in temp2 is copied into Result Register.

750 (No) — n<32 and (n+m-1)> 31?

760 (Yes) — Portion of field in both rT1 and rT2. Temp2 [31-n:0] copied into Result Register[31-n:0]. rT2 Bits[n+m-33:0] copied into Result[m-1:32-n]. The remaining bits of result are set to 0.

770 (No) — n>31. All field in rT2. Bits rT2[n+m-33:n-32] copied into result [m-1:0]. Rest of bits in Result Register are set to zero.

780 — Copy Result[m-1:0] into rD[m+p-1:p]. Copy remaining bits of rD2 from corresponding bits of rS2.

*Fig. 7*

SYSTEM AND METHOD FOR EXTRACTING FIELDS FROM PACKETS HAVING FIELDS SPREAD OVER MORE THAN ONE REGISTER

This application is a continuation of U.S. application Ser. No. 09/799,610, filed Mar. 7, 2001, now U.S. Pat. No. 7,039,060, the entirety of which is incorporated herein by reference.

BACKGROUND OF THE INVENTION

This invention relates generally to the field of network communication processors, and more specifically to the field of extracting bit fields from a packet.

Network communication systems demand fast performance. The performance of conventional processors in network communication systems is degraded by slow accessing of bit fields in received packets.

When a packet is received at a network processor it is stored in registers. The stored packets are not always aligned the same way in the registers. A stored packet may be stored over one or more registers and be offset. Conventional systems have a plurality of code paths written to handle the different possibilities of packet positioning within registers. For example, FIG. 1 shows different package storage possibilities 100. In this example, a combination of three registers 110 may store a packet having fields F1 and F2 in 4 different ways. Conventional systems have four code paths for extracting bit fields F1 and F2 based on the packet position determined during runtime. After determining a packet's storage position, conventional systems use the corresponding code path to perform a combination of shift and/or operations that shift a field into a desired position, mask the remaining non-field bits and store the field in a result register.

Therefore, it would be desirable to have a single set of instructions that may be used, regardless of the bit field's positioning in the registers to extract the bit field from the packet and insert in a result register.

SUMMARY OF THE INVENTION

Systems and methods consistent with the present invention extract fields from a packet using a pair of instructions.

A processing system for extracting a field from a packet consistent with the present invention includes an instruction memory having a pair of instructions, a processor having a set of general registers and temporary registers, a portion of the packet being stored in a pair of general registers. The processor is configured to extract, responsive to a first instruction, any part of the field in a first general register designated as a first source register. The processor is further configured to extract, responsive to a second instruction, any part of the field in a second general register designated as a second source register.

A method for extracting a field from a packet consistent with the present invention stores a portion of the packet in a pair of general registers, executes a first instruction extracting any part of the field from a first general register designated as a first source register, and executes a second instruction extracting any part of the field from a second general register designated as a second source register.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings:

FIG. 2a shows the fields of an EXTIV instruction consistent with methods and systems of the present invention;

FIG. 2b shows the fields of an INSV instruction consistent with methods and systems of the present invention;

FIG. 7 is a flowchart showing the steps of a method for processing an INSV instruction consistent with methods and systems of the present invention.

DETAILED DESCRIPTION OF THE PREFERRED EMBODIMENTS

Reference will now be made in detail to embodiments consistent with this invention that are illustrated in the accompanying drawings. The same reference numbers in different drawings generally refer to the same or like parts.

Figure 1:
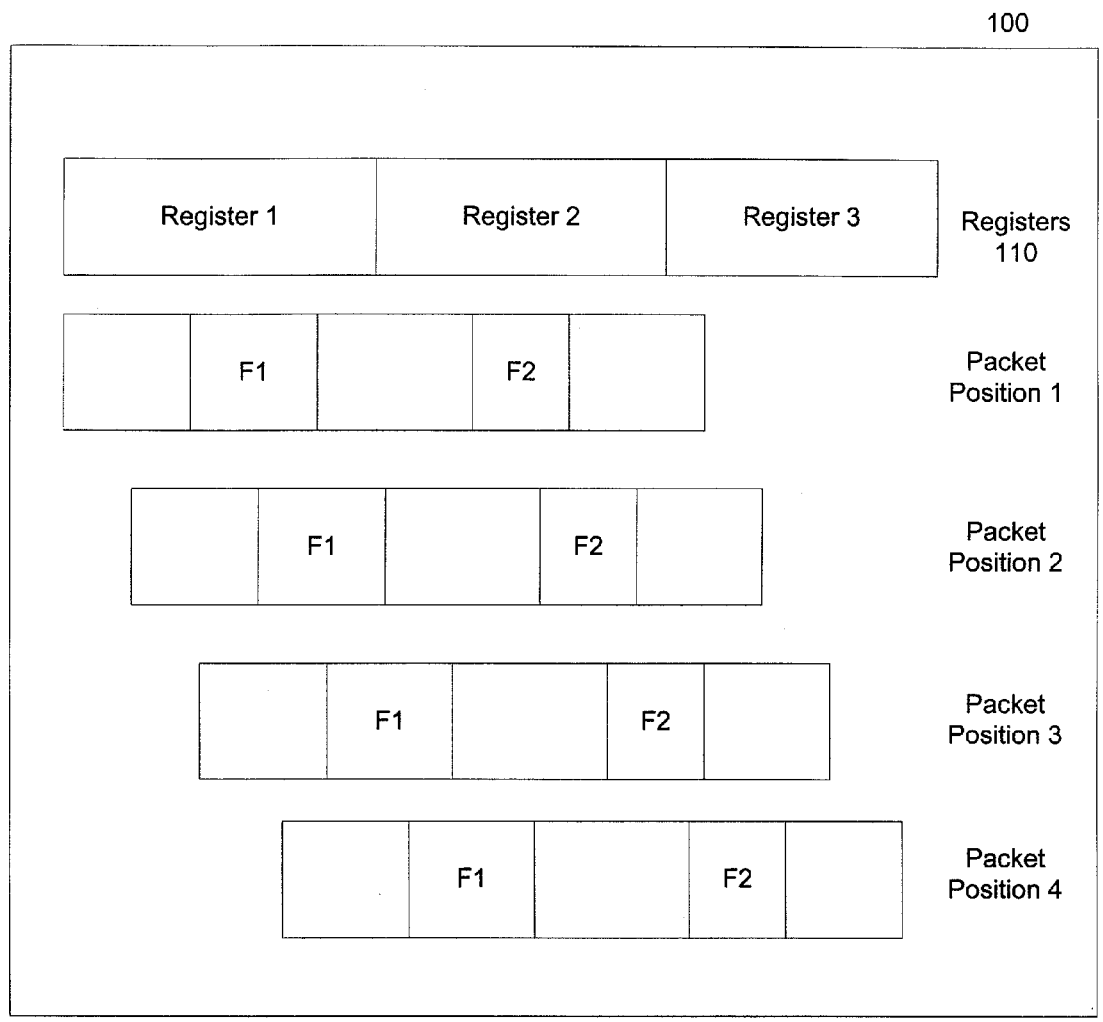
FIG. 1 is a diagram showing potential storage positions of a packet in a set of registers.

Current processing systems for network communications require a plurality of code paths to extract bit fields from a packet stored across a plurality of registers. Systems and methods consistent with the present invention provide a pair of instructions that may be used, regardless of the packet's position in registers, to extract and insert a field from the packet into a result register. Systems consistent with this invention can extract a field from data stored in a pair of words. For example, referring to FIG. 1, the system may extract field F1 from a pair of registers 1 and 2. F1 may be stored completely in register 1, completely in register 2 or partially in both registers. The present invention executes a pair of instructions, extract (EXTIV) and extract-insert (INSV), to extract the field from the pair of registers and insert into a final result register. The EXTIV instruction extracts any portion of field F1 in register 2 and places the extracted portion in a temporary holding register. The INSV instruction extracts any portion of field F1 in register 1 and places the extracted portion in a temporary result register. INSV merges the portion of F1 in the temporary result register with any portion of F1 in the temporary holding register and stores the entire field F1 in a final result register.

One example application of the systems and methods consistent with the present invention is the formation of a key used for a table lookup operation. In order to look up data in a table lookup unit, a processor sends an operation with data to the table lookup unit (TLU). The operation commands the TLU to look up data in a table using a key. This key is typically comprised of a number of unaligned fields in packet data. To form a key for accessing the TLU, the fields need to be extracted and then inserted in a result register in a specific order.

FIGS. 2a and 2b show the format of the pair of instructions consistent with the systems and methods of the present invention. FIG. 2a shows the format for EXTIV, which includes: 1) an opcode for EXTIV 200; 2) rS.sub.1 201 for designating a register that holds a width and offset data for the field of interest; 3) rT.sub.1 202 for designating a register that holds a low order word source; 4) rD.sub.1 203 designating a result register for storing an extracted field; 5) and a sub-opcode field for EXTIV 204.

An INSV instruction is executed following an EXTIV instruction to ensure that a complete field is extracted and stored in a result register. FIG. 2b shows the format for an INSV instruction. The INSV instruction includes: 1) an opcode for INSV 210; 2) rS.sub.2 211 designating a background data register; 3) rT.sub.2 212 designating a register that holds a high order word source; 4) rD.sub.2 213 designating a result register; and 5) a sub-opcode for INSV 214.

Figure 3:
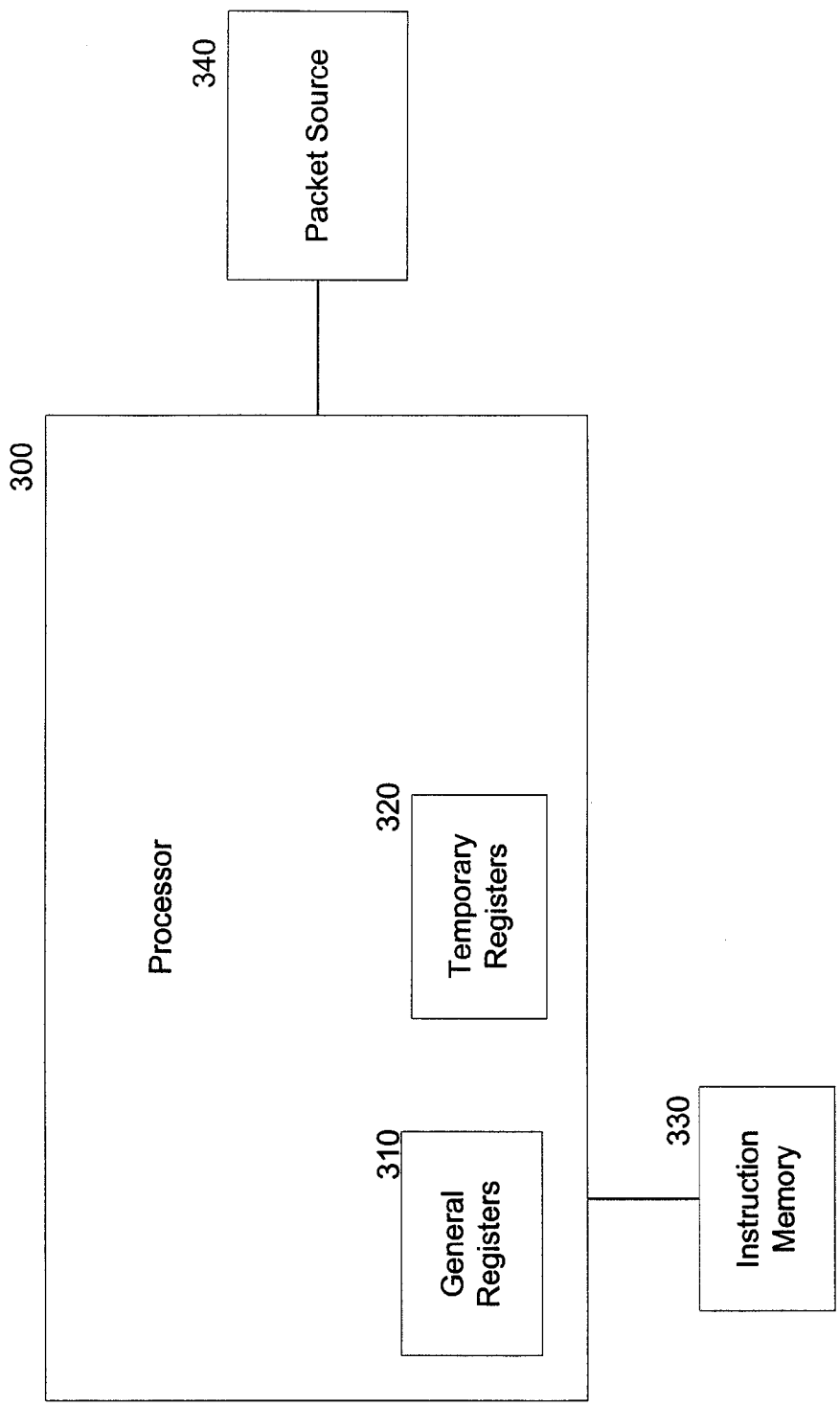
FIG. 3 is a block diagram of a processing system consistent with methods and systems of the present invention.

FIG. 3 shows an exemplary processing system that may be used in systems and methods consistent with the present invention. Processor 300 is preferably a reduced instruction set computer (RISC) processor that may include, among other elements, those in Lexra's LX4180 processor. Processor 300 includes general register 310 and temporary registers 320. Processor 300 couples to packet source 340 and instruction memory 330. Processor 300 processes instructions in instruction memory 330 such as the EXTIV and INSV instructions. Instruction memory 330 may be, for example, a cache, RAM or DRAM. Packet source 340 may have stored packets, or be an external source of packets for processing instructions in instruction memory 330.

Figure 4A:
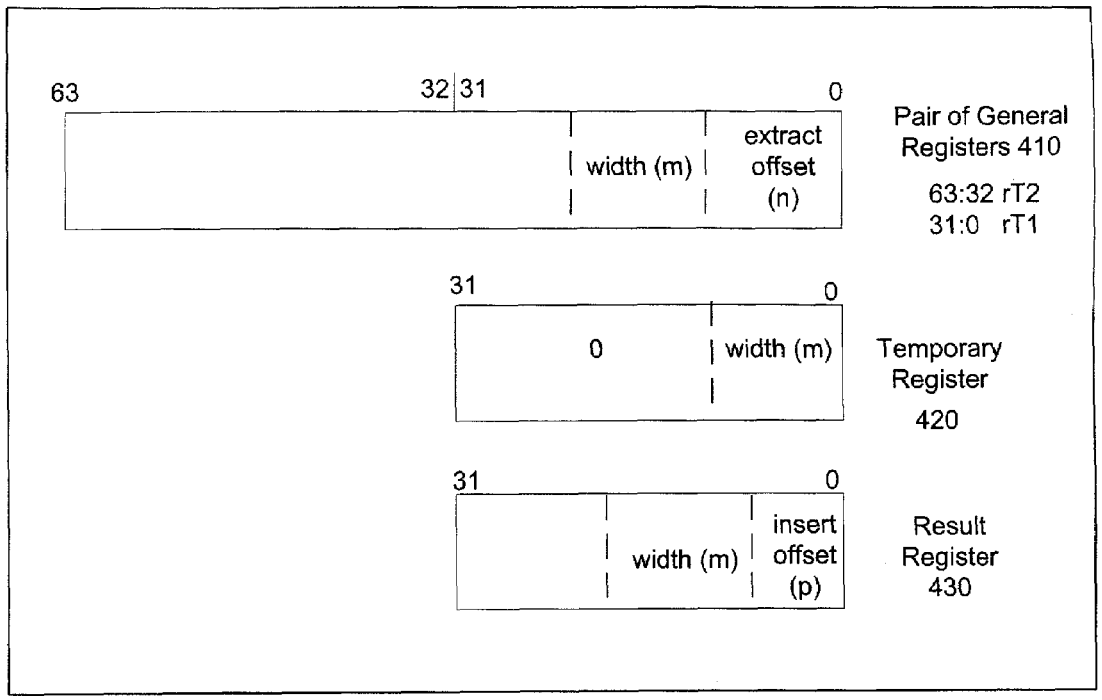
FIGS. 4a-4c show packet data and contents of a temporary and result register using three different data field placements consistent with methods and systems of the present invention.
Figure 4B:
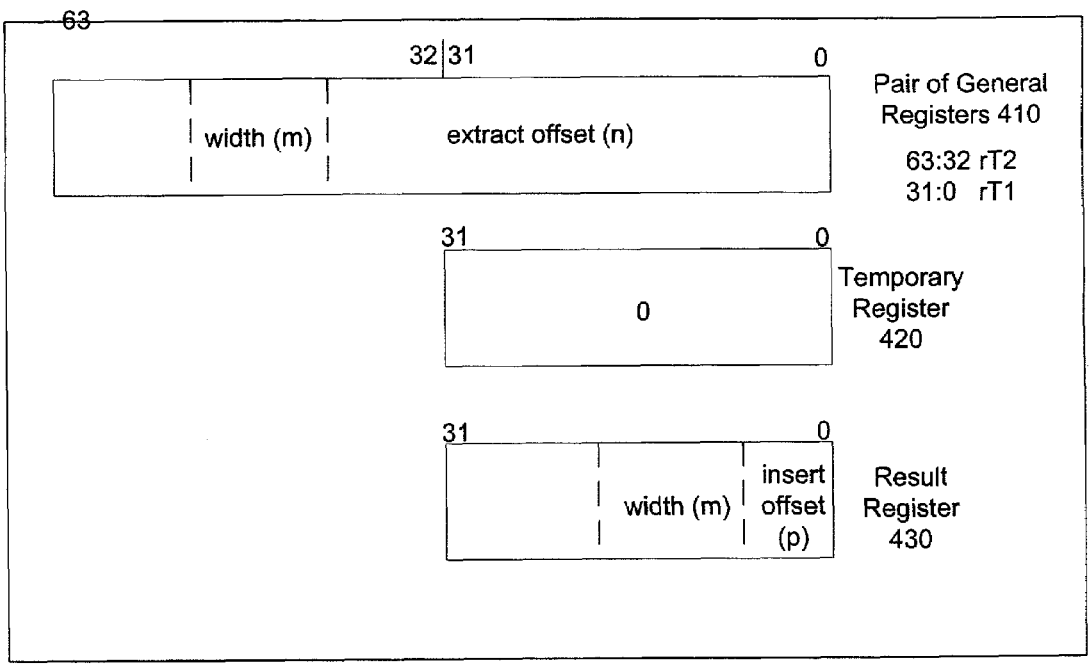
Figure 4C:
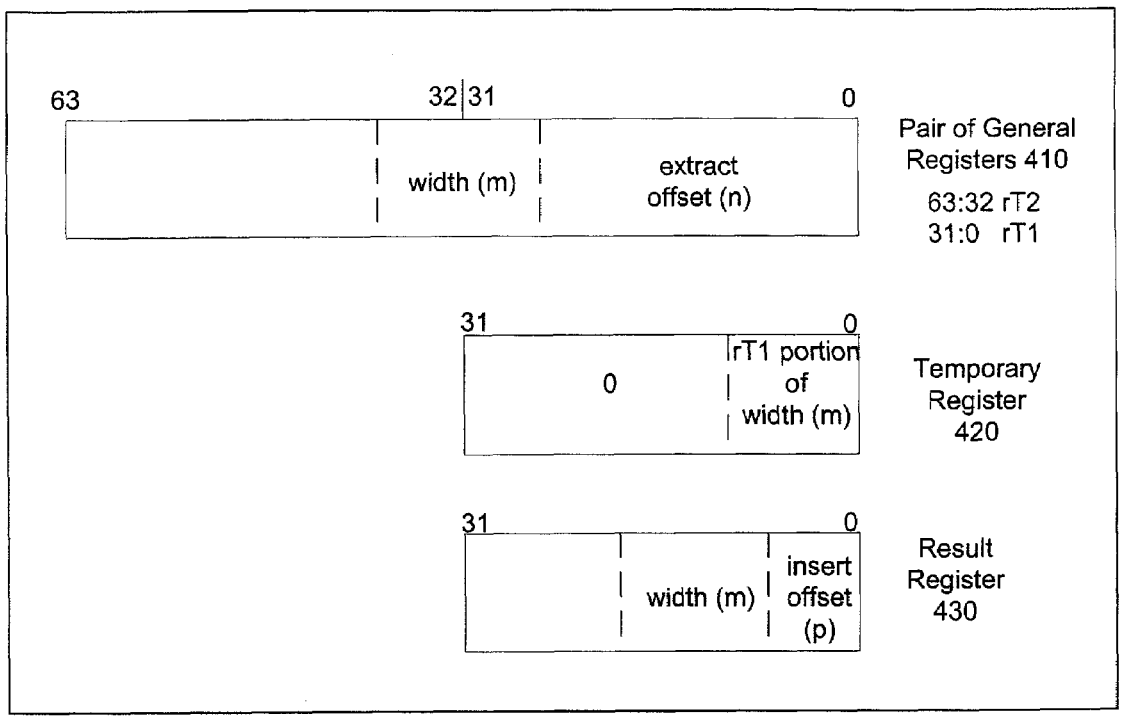

FIGS. 4a-4c show example register contents consistent with the present invention. In each of FIGS. 4a-4c, the field of interest is shown having width (m) and is offset in a pair of general registers rT.sub.1 and rT.sub.2 by an extract offset (n).

FIG. 4a shows the content of a pair of general registers 410, a temporary register 420, and a result register 430 where the field of interest is held entirely in a low order word in a register rT.sub.1. In this example, the EXTIV instruction extracts all of the field from register rT.sub.1 and stores the result in temporary register 420. The INSV instruction copies the field from the temporary register 420 to the result register 430 offset by insert offset (p).

FIG. 4b shows the content of a pair of general registers 410, a temporary register 420, and a result register 420 where the field of interest is held entirely in register rT.sub.2. In this example, the EXTIV instruction does not need to extract any of the field because no portion of the field is in register rT.sub.1. Therefore, the EXTIV instruction does not copy any data into the temporary register 420. The INSV instruction copies the field from register rT.sub.2 and stores the result in result register 430 offset by insert offset (p).

FIG. 4c shows the content of a pair of general registers 410, a temporary register 420, and a result register 430 where a portion of the field of interest is held in both registers rT.sub.2 and rT.sub.2. In this example, the EXTIV instruction extracts a first part of the field from register rT.sub.1 and stores the result in temporary register 420. The INSV instruction extracts a second part of the field from register rT.sub.2 and stores the result, along with the part of the field in the temporary register 420, in the result register 430 offset by insert offset (p).

Figure 5:
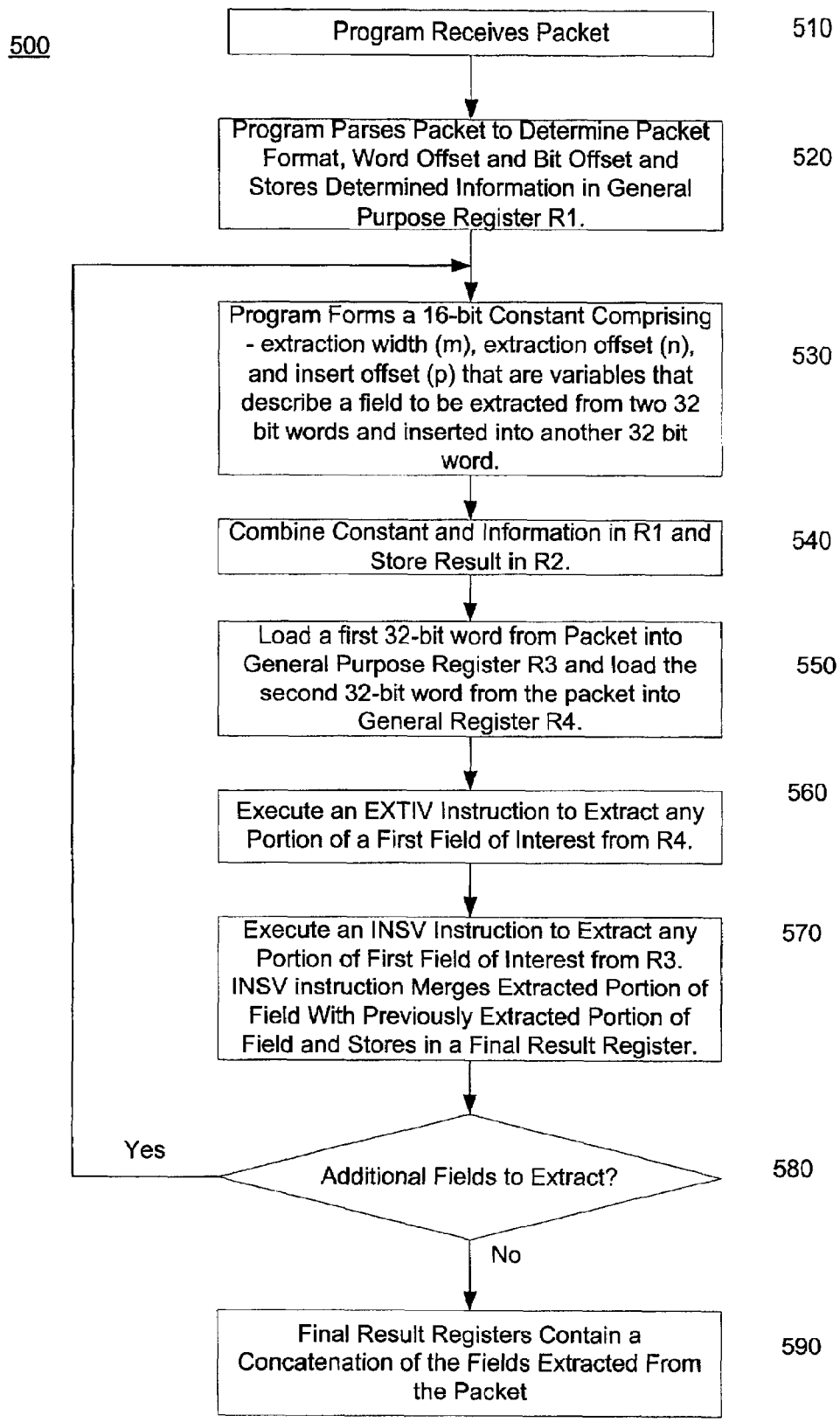
FIG. 5 is a flowchart showing the steps for extracting data from packet data consistent with methods and systems of the present invention.

FIG. 5 show the steps 500 for processing a packet in accordance with the present invention. A program running on processor 300 receives a packet from packet source 340 (step 510). The program parses the received packet to determine a packet format, word offset and bit offset and stores the determined information in a general purpose register R1 (step 520). A packet format is a pre-defined format of fields having set locations in the packet of a known size. The packet is stored at a known byte address in memory. A location of the fields of interest within the packet may be identified by a word and bit offset from the known byte address generally referred to here as the extraction offset. Based on the packet format, the executing program can determine information about fields in the packet including a width of the fields, an extraction offset, and an insert offset. The insert offset is the position the field is to be inserted in the result register.

To allow extraction of a particular field from the pair of registers holding at least a portion of the packet, the program forms a constant using the extraction width (m), extraction offset (n), and insert offset (p) for the field (step 530). This constant is combined with the packet information in R1 and stored in another general purpose register R2 (step 540). The program loads a first 32-bit word from the packet into a general purpose register R3 and loads the second 32-bit word of the packet into a general register R4 (step 550).

A field of interest in the packet may be in any of the positions shown in FIGS. 4a-4c. In order to extract the field, the program executes a EXTIV instruction followed by an INSV instruction. In this example, the EXTIV instruction in FIG. 2a designates R2 as the source for field width and offset data 201, R4 as the source for the low order word 202, and a general register R0 as the temporary result register 203. The EXTIV instruction extracts any portion of the field of interest from R4 and stores the result in an implied temporary register and in R0 (step 560). The m, n, and p values for this field in R2 are copied to another temporary register 320 for use by the INSV instruction. The steps for performing an EXTIV instruction are shown in FIG. 6 and discussed below.

After performing an EXTIV instruction, the program must execute an INSV instruction to extract any portion of the field in the upper order word in register R3. Using this example, the INSV instruction in FIG. 2b would designate R3 as the source of the high order word 212 and R5 as the final result register 213. The INSV instruction merges the portion of the field extracted from the high order word with the portion of the field extracted from the low order word and stores the result in a final result register R5 (step 570). Subsequent passes may use register R6, R7 . . . as space in R5 is exhausted. The steps for performing an INSV instruction are shown in FIG. 7 discussed below.

If the program requires the extraction of additional fields (step 580), then steps 530-570 are repeated for each additional field. Once all fields of interest have been extracted, the result registers R5, R6, . . . contain a concatenation of the fields extracted from the packet (step 590).

Figure 6:
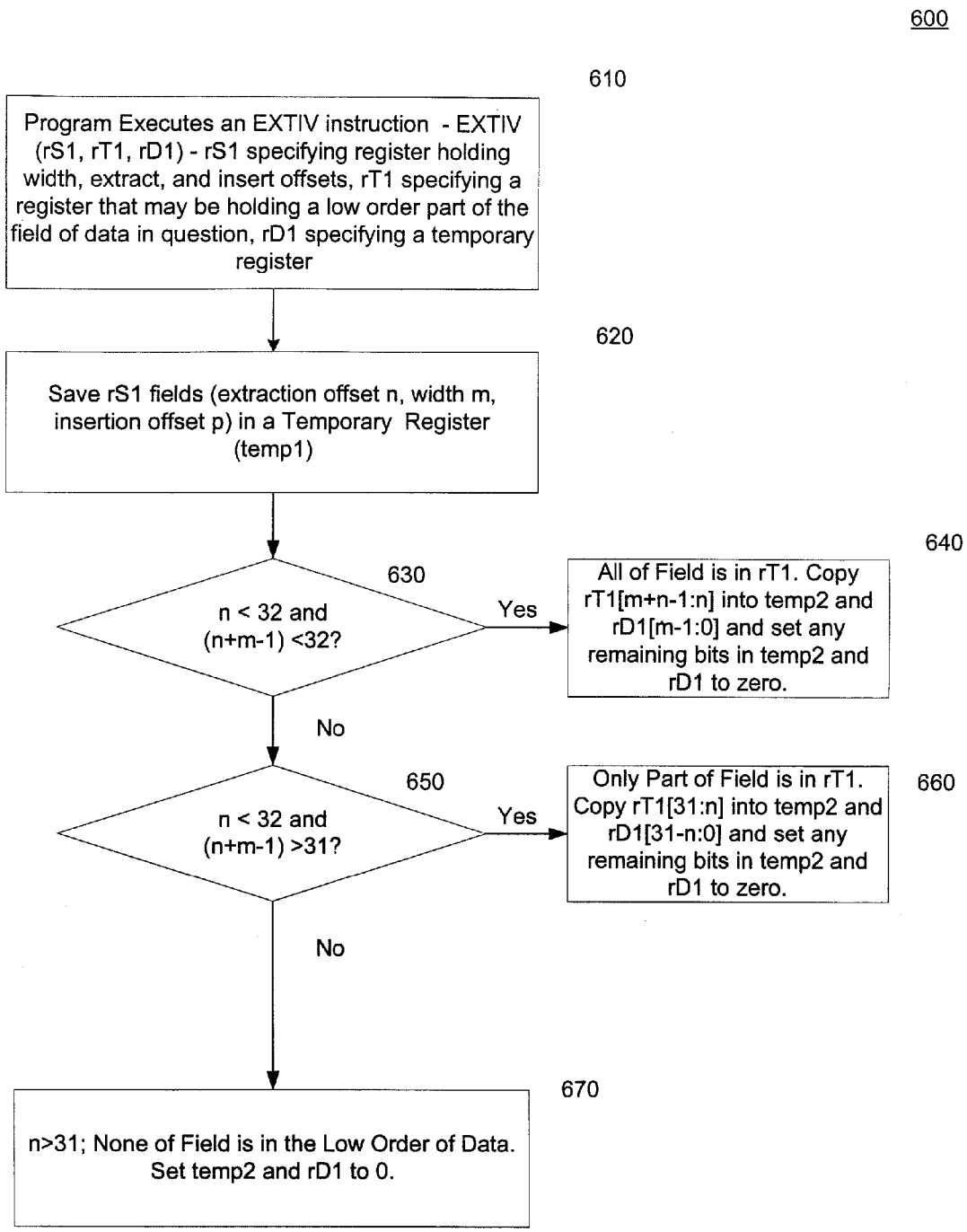
FIG. 6 is a flowchart showing the steps of a method for processing an EXTIV instruction consistent with methods and systems of the present invention.

FIG. 6 shows the steps of an exemplary method 600 for performing an EXTIV instruction. In method 600, instruction memory 330 has instructions that may be included, for example, in a program. The program executes the EXTIV instruction as shown in FIG. 2a (step 610). The processor copies information about the field to be extracted including its width m, extraction offset n, and insertion offset p, from the register designated by rS.sub.1 201 into one of the temporary registers 320 (temp1) (step 620). The extraction offset is the number of bits or bytes that the field of interest is displaced in the pair of words from which the field is to be extracted. For this example, register size is 32 bits. If the extraction offset is less than the register size, 32 bits, and the sum of the width of the field and the extraction offset minus 1 is less than 32 bits (step 630), then the entire field is within the low order word referred to by rT.sub.1 202 in EXTIV. The entire field is copied from the register referred to by rT.sub.1 202 into a temporary register 320 (temp2) and into the register referred to by rD.sub.1 203 and the remaining bits in temp2 and the register referred to by rD.sub.1 203 are set to zero (step 640). If the extraction offset is less than 32 bits and the sum of the width of the field and the extraction offset minus 1 is greater than 31 bits (step 650), then part of the field is in the low order word in the register designated by rT.sub.1 202 and the remaining part of the field is in the high order word for extraction by the INSV instruction. In this case, the EXTIV instruction copies the part of the field in the register referred to by rT.sub.1 202 into temp2 and into the register referred to by rD.sub.1 and any remaining bits in temp2 and the register referred to by rD.sub.1 are set to zero (step 660). Finally, if the extraction offset is greater than 31, then none of the field is in the low order word of data and temp2 and the register referred to by rD.sub.1 203 are set to zero (step 670).

FIG. 7 shows the steps of an exemplary method 700 for performing an INSV instruction according to the present invention. A program executes an INSV instruction as shown in FIG. 2b (step 710). The INSV instruction specifies the register holding the high order word that may include the field of interest, the final result register, and a backup data register. The temporary register temp1 holding information on the field and the temporary result register holding data extracted by the EXTIV instruction are both implied. The processor reads information about the field being extracted from a temporary register including its width m, extract offset n, and its insert offset p (step 720). The processor next determines whether the field fits entirely within a low order word based on the extract offset and the width of the field m (step 730). If the extract offset is less than 32 bits and the sum of width of the field and the extraction offset minus 1 is less than 32 bits then the field was completely extracted by the EXTIV instruction. Therefore, the contents of the temporary register temp2 holding the field extracted by the EXTIV instruction is copied into a final result register (step 740).

If the extraction offset is less than 32 bits and the sum of the width of the field and the extraction offset minus 1 is greater than 31 bits (step 750), then the field is contained in both the low order and high order words. The portion of the field extracted in the EXTIV instruction is copied from a temporary register temp2 to a final result register along with the portion of the field in the high order word (step 760). The entire field is then contained in the final result register.

If the extraction offset is greater than 31 bits, then the entire field is contained in the high order word. The field is copied from the register containing the high order word rT.sub.2 into the result register and any remaining bits in the result register are set to zero (step 770). No data needs to be copied from the temporary register temp2 because the EXTIV instruction did not extract any part of the field. The contents of the final result register are copied to the destination register rD.sub.2 and the remaining bits of rD.sub.2 not holding the field, are copied from rS.sub.2. Register rS.sub.2 holds a copy of data from rD.sub.2 so that bits not holding field data may be reinstated.

There are many variations that may be made consistent with the present invention. For example, in another embodiment, the extraction offset is relative to a position of a first field to be extracted. In this case, the extraction offset n refers to the fixed offset value of a field to be extracted relative to a position of a first field to be extracted. For example, if the first field's least significant bit is 60, and a current field to be extracted has a LSB of 40, the difference between these locations, −20, is stored as the extraction offset n for the current field.

Further, while the implementations above use registers being a word in size, systems and methods consistent with the present invention may be used with other sized registers.

The foregoing description is presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A processing system for extracting a field comprising one or more contiguous bits from a packet, said system comprising:
   a processor including a set of general registers, at least a portion of said packet being stored in a pair of said general registers, said processor being configured to:
      extract, responsive to a first extract instruction, a copy of any part of said field in a first one of the pair of said general registers designated as a first source register;
      extract, responsive to a second extract instruction, a copy of any part of said field in a second one of the pair of said general registers designated as a second source register; and
      insert, responsive to said second extract instruction, any part of said field extracted from said second source register along with any part of said field extracted from said first source register into a final result register of said general registers.

2. The processing system of claim 1, wherein the processor is further configured to:
   store, responsive to said first extract instruction, any part of said field extracted from said first source register within a temporary register;
   access said temporary register; and
   insert, responsive to said second extract instruction, any part of said field extracted from said first source register into said final result register.

3. The processing system of claim 1, wherein said processor is further configured to:
   extract additional fields from the packet, insert a value contained in the additional fields into said final result register; and
   access a table lookup unit using the value in said final result register as a key.

4. The processing system of claim 1, wherein said first extract instruction is configured to:
   specify one or more of said general registers as locations of input or output data for execution of said first extract instruction.

5. The processing system of claim 4, wherein:
   a first one of said specified one or more general registers is configured to:
      store field information for the field to be extracted from said packet, wherein said field information includes a width of the field and an extraction offset indicating a position of the field in the packet; and
   a second one of said specified one or more general registers corresponding to said first source register is configured to:
      store a low-order portion of said packet possibly including a part of said field.

6. The processing system of claim 5, wherein to extract any part of said field in said first source register, responsive to said first extract instruction, said processor is further configured to:
   copy at least a part of said field information stored in said first one of said specified one or more general registers to a first temporary register.

7. The processing system of claim 5, wherein to extract any part of said field in said first source register, responsive to said first extract instruction, said processor is further configured to:

determine, dependent upon said field information, whether any part of said field is stored in said first source register.

8. The processing system of claim 7, wherein in response to determining that any part of said field is stored in said first source register, said processor is further configured to:
copy said part of said field to a second temporary register.

9. The processing system of claim 8, wherein said processor is further configured to:
zero any bits of said second temporary register that do not correspond to said part of said field.

10. The processing system of claim 1, wherein said second extract instruction is configured to:
specify one or more of said general registers as locations of input or output data for execution of said second extract instruction.

11. The processing system of claim 10, wherein:
a first one of said specified one or more general registers is configured to:
store a result of said second extract instruction;
a second one of said specified one or more general registers corresponding to said second source register is configured to:
store a high-order portion of said packet possibly including a part of said field; and
a third one of said specified one or more general registers is configured to:
store a copy of a value of said first one of said specified one or more general registers determined prior to execution of said second extract instruction.

12. The processing system of claim 11, wherein to extract any part of said field in said second source register, responsive to said second extract instruction, said processor is further configured to:
determine whether any part of said field is stored in said second source register, dependent upon field information for the field to be extracted from said packet, wherein said field information includes:
a width of the field; and
an extraction offset indicating a position of the field in the packet.

13. The processing system of claim 12, wherein said processor is further configured to:
retrieve said field information from a first temporary register in which said field information was stored by an instance of said first extract instruction executed prior to said second extract instruction.

14. The processing system of claim 12, wherein in response to determining that any part of said field is stored in said second source register, said processor is further configured to:
copy said part of said field to said first one of said specified one or more general registers.

15. The processing system of claim 14, wherein said processor is further configured to:
copy said part of said field to said first one of said specified one or more general registers according to an insertion offset specified in said field information.

16. The processing system of claim 12, wherein said processor is further configured to:
determine, dependent upon said field information, whether any additional part of said field stored in said first source register was stored in a second temporary register by an instance of said first extract instruction executed prior to said second extract instruction.

17. The processing system of claim 16, wherein in response to determining that said additional part of said field was stored in said second temporary register, said processor is further configured to:
copy said additional part of said field to said first one of said specified one or more general registers.

18. The processing system of claim 12, wherein for a given bit position within said first one of said specified one or more general registers not occupied by a bit of said field extracted from said first or said second source register, said processor is further configured to:
copy to said given bit position a corresponding bit of said third one of said specified one or more general registers.

19. The processing system of claim 1, wherein said processor is further configured to:
parse the packet to determine a packet format.

20. A method for extracting a field comprising one or more contiguous bits from a packet, said method comprising:
storing at least a portion of said packet being stored in a pair of said general registers;
executing a first extract instruction, wherein executing said first extract instruction includes extracting a copy of any part of said field in a first one of the pair of general registers designated as a first source register;
executing a second extract instruction, wherein executing said second extract instruction includes extracting a copy of any part of said field in a second one of the pair of general registers designated as a second source register; and
inserting any part of said field extracted from said second source register along with any part of said field extracted from said first source register into a final result register of said general registers.

21. The method of claim 20, wherein executing said first extract instruction further includes:
storing any part of said field extracted from said first source register within a temporary register;
accessing said temporary register; and
inserting any part of said field extracted from said first source register into said final result register.

22. The method of claim 20, further comprising:
extracting additional fields from the packet;
inserting a value contained in the additional fields into said final result register; and
accessing a table lookup unit using the value in said final result register as a key.

23. The method of claim 20, wherein said first extract instruction is configured to:
specify one or more of said general registers as locations of input or output data for execution of said first extract instruction.

24. The method of claim 23, further comprising:
storing, within a first one of said specified one or more general registers, field information for the field to be extracted from said packet, wherein said field information includes:
a width of the field; and
an extraction offset indicating a position of the field in the packet; and
storing, within a second one of said specified one or more general registers corresponding to said first source register, a low-order portion of said packet possibly including a portion of said field.

25. The method of claim 24, wherein extracting any part of said field in said first source register includes:
copying at least a part of said field information stored in said first one of said specified one or more general registers to a first temporary register.

26. The method of claim 24, wherein extracting any part of said field in said first source register includes:

determining, dependent upon said field information, whether any part of said field is stored in said first source register.

27. The method of claim 26, further comprising:
copying said portion of said field to a second temporary register in response to determining that any part of said field is stored in said first source register.

28. The method of claim 27, further comprising:
zeroing any bits of said second temporary register that do not correspond to said part of said field.

29. The method of claim 20, wherein said second extract instruction is configured to:
specify one or more of said general registers as locations of input or output data for execution of said second extract instruction.

30. The method of claim 29, further comprising:
storing, within a first one of said specified one or more general registers, a result of said second extract instruction;
storing, within a second one of said specified one or more general registers corresponding to said second source register, a high-order portion of said packet possibly including a part of said field; and
storing, within a third one of said specified one or more general registers a copy of a value of said first one of said specified one or more general registers determined prior to execution of said second extract instruction.

31. The method of claim 30, wherein extracting any part of said field in said second source register includes:
determining whether any part of said field is stored in said second source register, dependent upon field information for the field to be extracted from said packet, wherein said field information includes:
a width of the field; and
an extraction offset indicating a position of the field in the packet.

32. The method of claim 31, further comprising:
retrieving said field information from a first temporary register in which said field information was stored by an instance of said first extract instruction executed prior to said second extract instruction.

33. The method of claim 31, further comprising:
copying said part of said field to said first one of said specified one or more general registers in response to determining that any portion of said field is stored in said second source register.

34. The method of claim 33, further comprising:
copying said part of said field to said first one of said specified one or more general registers according to an insertion offset specified in said field information.

35. The method of claim 32, further comprising:
determining, dependent upon said field information, whether any additional part of said field stored in said first source register was stored in a second temporary register by an instance of said first extract instruction executed prior to said second extract instruction.

36. The method of claim 35, further comprising:
copying said additional part of said field to said first one of said specified one or more general registers in response to determining that said additional part of said field was stored in said second temporary register.

37. The method of claim 31, further comprising:
for a given bit position within said first one of said specified one or more general registers not occupied by a bit of said field extracted from said first or said second source register, copying to said given bit position a corresponding bit of said third one of said specified one or more general registers.

38. The method of claim 20, further comprising:
parsing the packet to determine a packet format.

* * * * *